United States Patent
Werhane et al.

(10) Patent No.: US 11,675,589 B2
(45) Date of Patent: Jun. 13, 2023

(54) SERIAL INTERFACES WITH SHADOW REGISTERS, AND ASSOCIATED SYSTEMS, DEVICES, AND METHODS

(71) Applicant: Micron Technology, Inc., Boise, ID (US)

(72) Inventors: Kevin G. Werhane, Kuna, ID (US); Daniel S. Miller, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/464,650

(22) Filed: Sep. 1, 2021

(65) Prior Publication Data
US 2023/0063588 A1 Mar. 2, 2023

(51) Int. Cl.
G06F 9/30 (2018.01)
G06F 13/42 (2006.01)

(52) U.S. Cl.
CPC ...... *G06F 9/30116* (2013.01); *G06F 13/4282* (2013.01)

(58) Field of Classification Search
CPC .............. G06F 9/30116; G06F 13/4282
See application file for complete search history.

(56) References Cited

U.S. PATENT DOCUMENTS

| | | | |
|---|---|---|---|
| 8,464,112 B2* | 6/2013 | Whetsel | G01R 31/31723 714/733 |
| 10,896,738 B1 | 1/2021 | Dono et al. | |
| 2006/0156104 A1* | 7/2006 | Chang | G01R 31/318555 714/724 |
| 2008/0290878 A1* | 11/2008 | Waayers | G01R 31/318555 324/537 |
| 2019/0064267 A1* | 2/2019 | Whetsel | G01R 31/31725 |

* cited by examiner

*Primary Examiner* — Zachary K Huson
(74) *Attorney, Agent, or Firm* — Perkins Coie LLP

(57) ABSTRACT

Serial interfaces with shadow registers, and associated systems, devices, and methods are described herein. In one embodiment, a serial interface is an IEEE 1500 interface, such as of an interface die of a high bandwidth memory (HBM) device. The IEEE 1500 interface includes (a) a primary wrapper data register (WDR) configured to store first information received in a first wrapper serial input (WSI) signal, (b) a shadow WDR configured to store second information received in a second WSI signal, and (c) a multiplexer. The multiplexer is configured to (i) receive the first information from the primary WDR, (ii) receive the second information from the shadow WDR, and (iii) output the first information or the second information based at least in part on a control signal input into the multiplexer.

20 Claims, 6 Drawing Sheets

SERIAL INTERFACES WITH SHADOW REGISTERS, AND ASSOCIATED SYSTEMS, DEVICES, AND METHODS

TECHNICAL FIELD

The present disclosure is related to serial interfaces with one or more shadow registers, and associated systems, devices, and methods. For example, several embodiments of the present disclosure are directed to serial testing interfaces for high bandwidth memory (HBM) devices that include at least one shadow register in addition to a primary register for storing information (e.g., serial commands, address bits, and/or data sets).

BACKGROUND

A semiconductor device (e.g., a processor, a memory device, a memory system, or a combination thereof) can include one or more semiconductor circuits configured to store and/or process information. For example, a semiconductor device can include a memory device, such as a volatile memory device, a non-volatile memory device, or a combination device. Memory devices, such as dynamic random-access memory (DRAM) and/or high bandwidth memory (HBM), can utilize electrical energy to store and access data.

With technological advancements in other fields and increasing applications for semiconductor devices, the market is continuously looking for faster, more efficient, and smaller devices. To meet the market demand, the semiconductor devices are repeatedly being improved. Improvements, generally, may include increasing circuit density, increasing operating speeds or otherwise reducing operational latency, increasing reliability, increasing data retention, reducing power consumption, or reducing manufacturing costs, among other metrics.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1B:
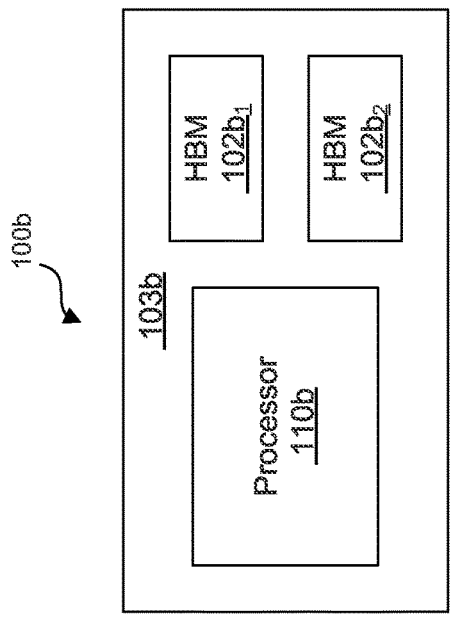
FIGS. 1A-1E are partially schematic block diagrams of example memory systems configured in accordance with various embodiments of the present technology.

As discussed in greater detail below, the technology disclosed herein relates to serial interfaces with one or more shadow registers, and associated systems, devices, and methods. For example, several embodiments of the present disclosure are directed to serial testing interfaces for HBM devices that include at least one shadow register in addition to a primary register for storing information (e.g., serial commands, address bits, and/or data sets). A person skilled in the art, however, will understand that the technology may have additional embodiments and that the technology may be practiced without several of the details of the embodiments described below with reference to FIGS. 1A-5.

In the illustrated embodiments below, the serial interfaces are primarily described in the context of HBM devices incorporating serial testing interfaces (e.g., IEEE 1500 or P1500 interfaces) having wrapper data registers (WDRs) for loading information (e.g., test mode address bits and/or test mode data) into mode latches of DRAM memory devices of the HBM devices (e.g., in response to vendor specific instructions or commands). Serial interfaces of the present technology, however, can include interfaces other than testing or P1500 interfaces. Additionally, or alternatively, serial interfaces of the present technology can be incorporated into other types of devices, including HBM or other memory devices incorporating SRAM, NAND, phase change memory, ferroelectric, and/or other storage media that are not NAND-based (e.g., NOR-based), are only partially NAND-based, or are volatile. Moreover, testing interfaces of the of present technology can include registers other than WDRs that can be loaded with information and/or can be operated in accordance with any of the various methods described herein. Furthermore, serial testing interfaces of the present technology can be operated in response to instructions or commands other than vendor specific commands.

A. Overview

Many memory devices include internal test modes for testing, diagnosing, and/or debugging the memory devices. The internal test modes of a memory device can be available to a host device (e.g., a controller or processor) of a memory system and/or to another device (e.g., a test circuit, a probe, an upstream controller or processor, etc.) external to the memory device. For example, in HBM memory systems, a memory device can be packaged with a host device (e.g., a controller or processor) on a support structure (e.g., on a package substrate) in a system-in-package (SiP) configuration. Continuing with this example, the host device can instruct the memory device (a) to transition into one or more test modes internal to the memory device and/or (b) to execute one or more test operations while the memory device is in the one or more test modes. In this example, the host device and/or the memory device can use various test interfaces, such as an IEEE 1500 interface (also referred to as a P1500 interface herein) or another test interface, included on an interface die of the memory device to (a) receive signals from the host device, (b) transition the HBM device into a test mode, (c) facilitate execution of a test operation corresponding to the test mode, and/or (d) transmit (e.g., resulting) signals to the host device.

Additionally, or alternatively, another device (e.g., a testing circuit, a probe, an upstream controller or processor, etc.) external to the memory device and different from the host device can instruct the memory device (a) to transition into various test modes internal to the memory device and/or (b) to execute various test operations while in the various test modes. Some of the various test modes can be reserved, restricted to authorized users, and/or vendor specific. In many memory devices, the external devices are limited to accessing the various test modes via only the P1500 interface of the memory device.

The P1500 interface is a serial interface that is commonly included on an interface die of an HBM device. The P1500 interface typically includes a P1500 circuit that translates instructions and/or data received from and/or transmitted to the external device. The P1500 circuit includes a plurality of registers that are used to (a) transition the HBM device into a test mode and (b) facilitate execution of various test operations. These registers typically include a wrapper instruction register (WIR) that enables wrapper operations, establishes test mode or function operation of the HBM device, and/or generates control signals for selection and operation of other data registers. The registers also commonly include (a) a wrapper bypass register (WBY) that provides a bypass path for WSI and WSO signals that are used to scan-in and scan-out wrapper data and instructions, (b) a wrapper boundary register (WBR) that applies test data stimuli and captures pattern responses, and (c) a wrapper data register (WDR) that is a (e.g., user-specific) shift register often used to store and output information (e.g., test mode address bits and/or test mode data) corresponding to various (e.g., vendor specific) instructions received at the WIR.

When vendor specific instructions are provided to the WIR of the P1500 interface, corresponding information can be loaded into the WDR. In particular, a single bit of the corresponding information can be loaded into the WDR every 20 ns in accordance with a minimum clock rate specification, known as tCKTP. Thus, for 15 bits of information, approximately 300 ns is required to load all of the corresponding information into the WDR. The information is then output to one or more mode latches to, for example, transition the HBM device into a corresponding test mode and/or to execute corresponding test operations. Another 300 ns is then required to load the WDR with new information. The new information can correspond to transitioning the HBM device to another test or operational mode or can correspond to transitioning the HBM device out of a test or operational mode (also known as "clearing" the mode corresponding to the previous information output to the mode latches). In other words, using the P1500 interface, approximately 300 ns is required to load information into the WDR and change information loaded into the mode latches of an HBM device.

Certain vendor specific testing, diagnosing, and/or debugging activities of the HBM device require a faster sequence of test modes than can currently be provided by the WDR in accordance with the 20 ns minimum clock rate specification tCKTP. For example, as discussed above, the current capabilities of the WDR include loading 15 bits of information approximately every 300 ns. But test operations involving clocking a TSV capacitance test structure of the HBM device and/or toggling signals for perimeter die-crack circuitry of the HBM device require test mode changes within approximately 30 ns, which is approximately ten times faster than the current capabilities of the WDR.

To address these concerns, the present technology is directed to P1500 interfaces that include P1500 circuits having a plurality of WDRs. More specifically, a P1500 circuit in some embodiments of the present technology includes a primary WDR and one or more duplicate or shadow WDRs. Each WDR can be loaded with (e.g., different) information and can be configured to provide the respective information to a multiplexer of the P1500 circuit. The P1500 circuit can further include a counter that can be used to control the output of the multiplexer. In some embodiments, a value stored by the counter can be updated approximately every 20 ns, meaning that an output of the multiplexer can be updated approximately every 20 ns. In turn, mode latches that are coupled to the output of the multiplexer can receive new information from the WDRs approximately every 20 ns once the WDRs have been loaded. As such, the present technology provides P1500 testing interfaces that can facilitate executing various testing, diagnosing, and/or debugging activities of an HBM requiring faster sequences of test modes.

Figure 1D:
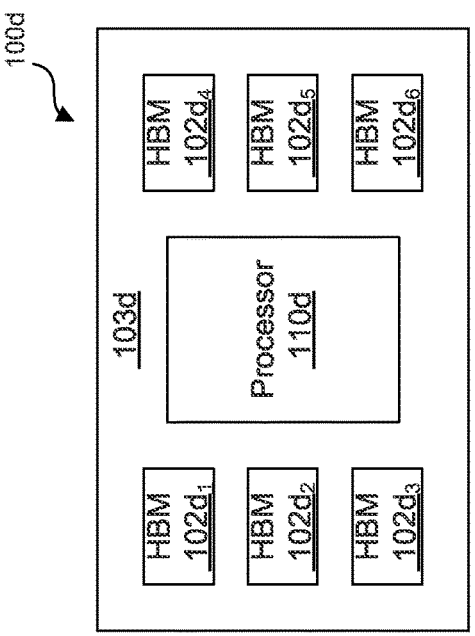
Figure 1A:
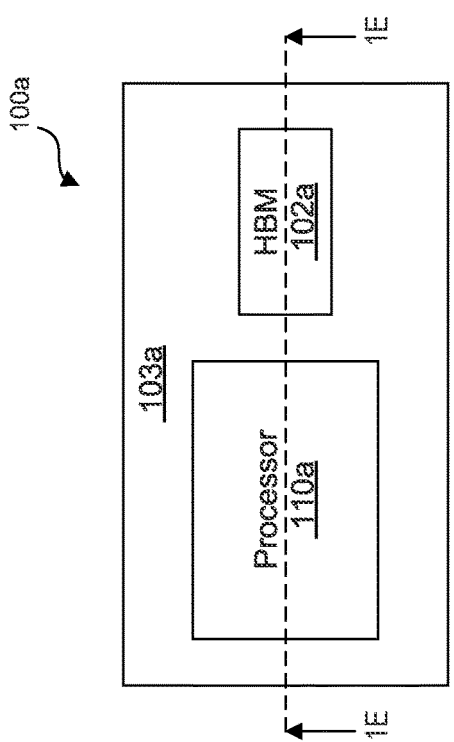
Figure 1C:
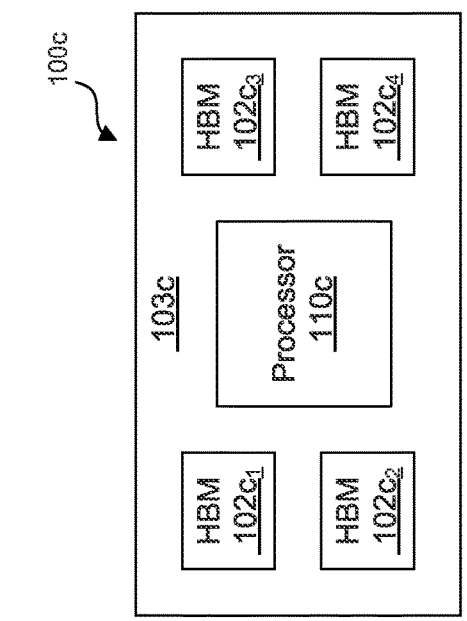

B. Selected Embodiments of Memory with Serial Interfaces Having Duplicate Registers, and Associated Systems, Devices, and Methods FIGS. 1A-1E are partially schematic, top views of apparatuses 100a-100e (e.g., memory systems) configured in accordance with various embodiments of the present technology. In some embodiments, the apparatuses 100a-100d are SiP devices that each includes a processor 110 (e.g., a central processing unit (CPU), a graphics processing unit (GPU), or the like) and one or more memory devices 102 (e.g., HBMs) mounted on a support structure 103 (e.g., a package substrate, an interposer, or the like). For example, FIG. 1A illustrates a first SiP device 100a that includes one memory device 102a and one processor 110a mounted on a structure 103a. FIG. 1B illustrates a second SiP device 100b that includes two memory devices $102b_1$ and $102b_2$ and one processor 110b mounted on a structure 103b. FIG. 1C illustrates a third SiP device 100c that includes four memory devices $102c_1$-$102c_4$ and one processor 110c mounted on a structure 103c. FIG. 1D illustrates a fourth SiP device 100d that includes six memory devices $102d_1$-$102d_6$ and one processor 110d mounted on a structure 103d. Apparatuses 100 configured in accordance with other embodiments of the present technology can include more than one processor 110 and/or a different (e.g., a greater or lesser) number of memory devices 102 than shown in FIGS. 1A-1D.

Figure 1E:
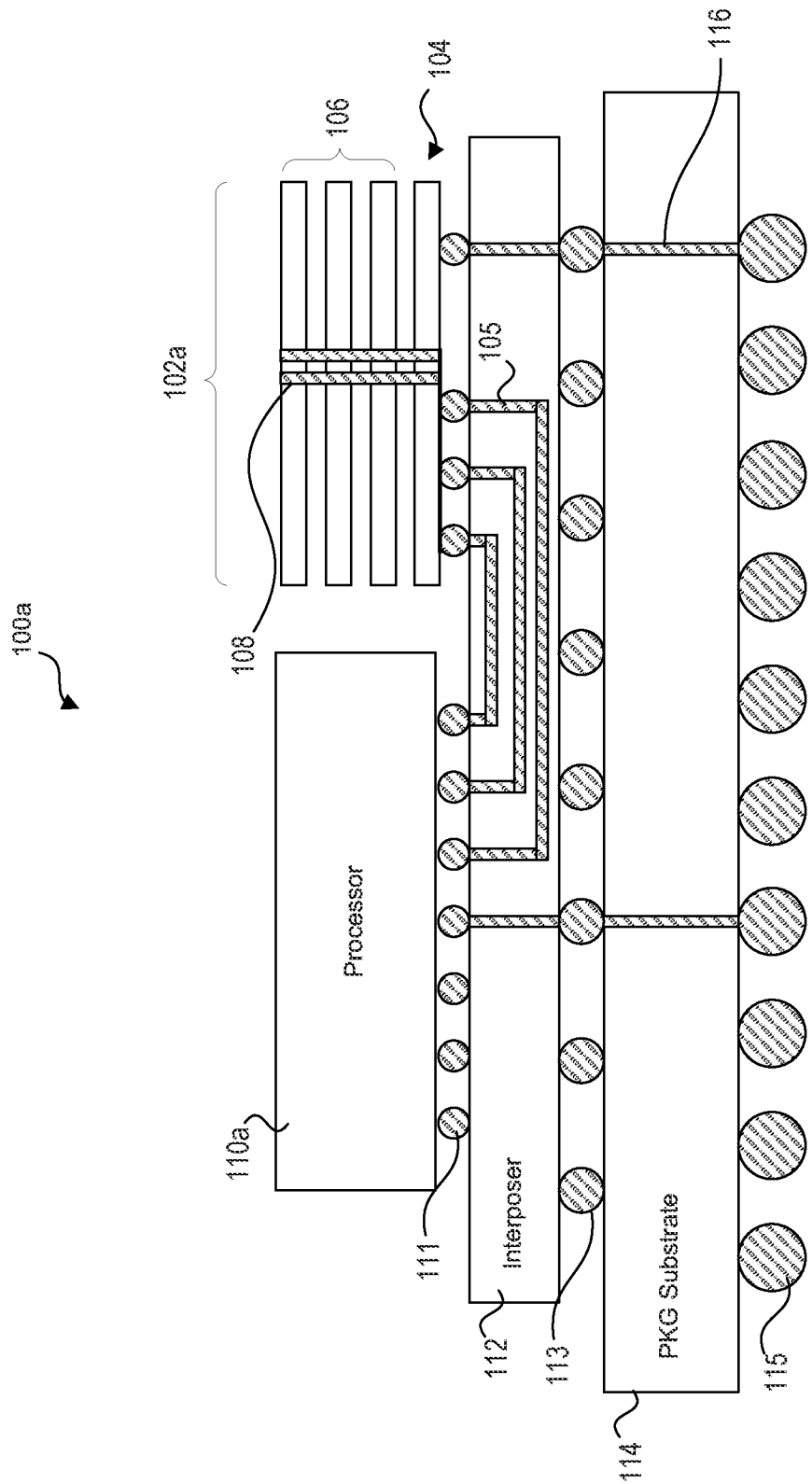

Using the SiP device 100a as an illustrative example of apparatuses 100 of the present technology, FIG. 1E illustrates a partially schematic, cross-sectional side view of the SiP device 100a taken along a line 1E-1E of FIG. 1A. As shown, the SiP device 100a includes the memory device 102a and the processor 110a packaged together on a package substrate 114 and/or on an interposer 112. The package substrate 114 and/or the interposer 112 can be the support structure 103a of FIG. 1A. The processor 110 can act as a host device of the SiP device 100a.

In some embodiments, the memory device 102a can be an HBM device that includes an interface (or logic) die 104 and one or more memory core dies 106 stacked on the interface die 104. The memory device 102a can include one or more through silicon vias (TSVs) 108, which may be used to couple the interface die 104 and the core dies 106.

The interposer 112 can provide electrical connections between the processor 110a, the memory device 102a, and/or the package substrate 114. For example, the processor 110a and/or the memory device 102a can be coupled to the interposer 112 by a number of internal connectors (e.g., micro-bumps 111). The interposer 112 can include channels 105 (e.g., an interfacing or a connecting circuit) that electrically couple the processor 110a and the memory device 102a through the corresponding micro-bumps 111. Although only three channels 105 are shown in FIG. 1E, apparatuses 100 of other embodiments of the present technology can include a greater or fewer number of channels 105 than shown in FIG. 1E. The interposer 112 can be coupled to the package substrate 114 using one or more additional connections (e.g., intermediate bumps 113, such as C4 bumps).

The package substrate 114 can provide an external interface for the SiP device 100a. For example, the package substrate 114 can include external bumps 115, some of which may be coupled (using, e.g., Through-Silicon Vias (TSVs)) to the processor 110a, the memory device 102a, or both. The package substrate 114 can further include direct access (DA) electrical connectors 116 (e.g., bumps, TSVs, etc.) electrically coupling devices external to the SiP device 100a to the interface die 104 of the memory device 102a through the package substrate 114 and the interposer 112. For example, the DA electrical connectors 116 can include one or more of the external bumps 115, one or more TSVs extending through the package substrate 114, one or more of the intermediate bumps 113, one or more TSVs extending through the interposer 112, and/or one or more of the micro bumps 111.

In some embodiments, the DA electrical connectors 116 (e.g., one or more of the external bumps 115) can be organized into a probe pad (e.g., a set of test connectors). An external device, such as a tester, can be coupled onto the probe pad in order to directly communicate with the memory device 102a. In other words, the external device can send signals to and/or receive signals from the memory device 102a using the DA electrical connectors 116 and without the signals being passed to or through the processor 110a. The tester can be used to pre-load one or more test patterns into a look up table of the interface die 104. The tester may then provide one or more test instructions along the DA electrical connectors 116. In turn, the interface die 104 can perform one or more tests on the core die 106 based at least in part on the test instructions and the pre-loaded test patterns, and can generate result information. After performing the tests, the tester can read the result information out through the DA electrical connectors 116.

The test patterns and the instructions can correspond to one or more tests performed on the memory device 102a after it has been packaged into the SiP device 100a. The test may involve loading a pattern of data into one or more memory cells of the memory device 102a as part of a write operation, retrieving stored information from the memory cells of the memory device 102a as part of a read operation, and/or comparing the written data to the read data. A test may be performed using a built-in self-test (BIST) circuit or another circuit of the memory device 102a. The tests may be performed using long test patterns with random characteristics, which may require more storage space than is practical in the BIST or other circuits. Such tests may be performed by directly sending test patterns and instructions through the DA electrical connectors 116.

Figure 2:
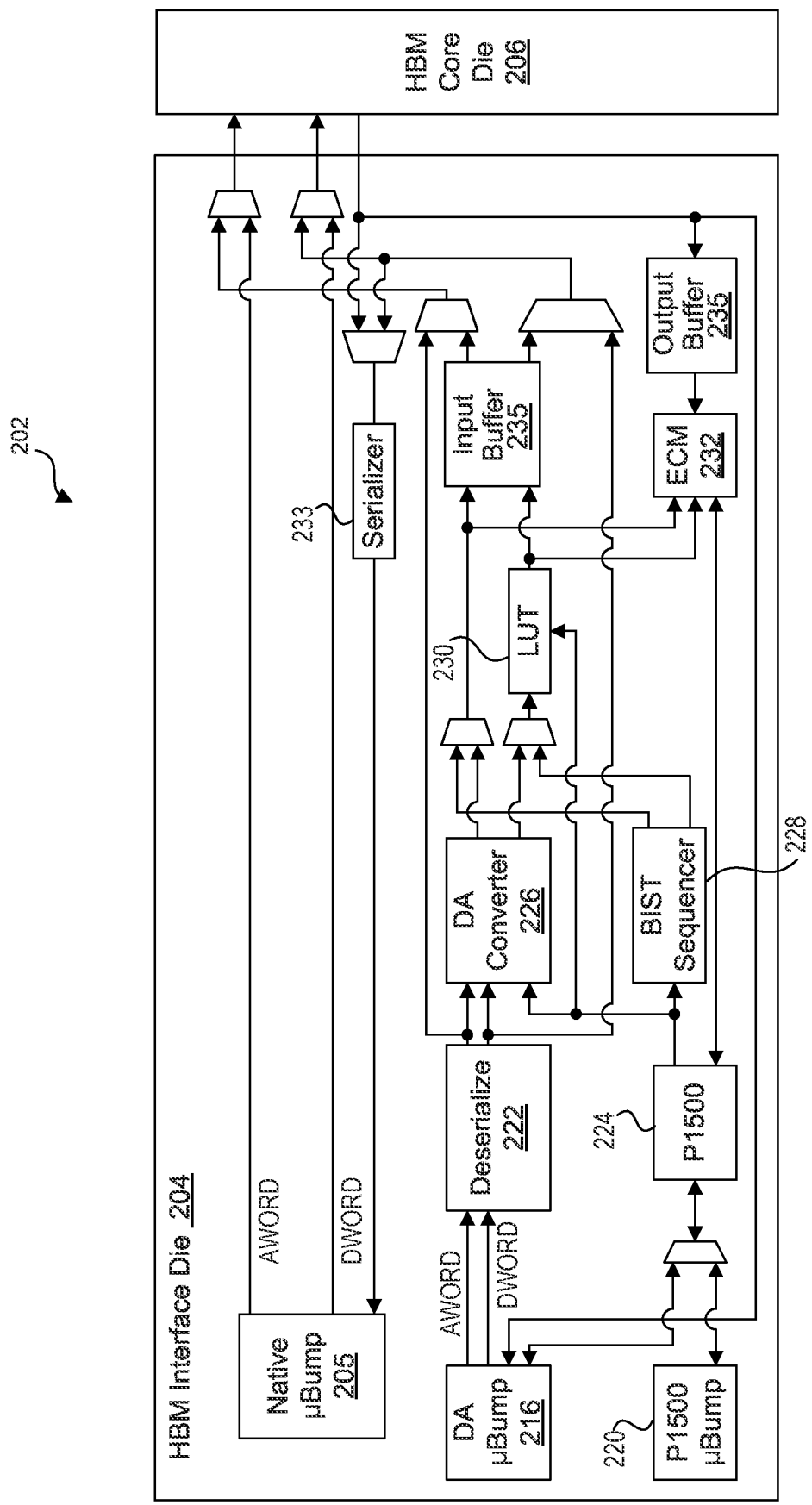
FIG. 2 is a partially schematic block diagram of a memory device configured in accordance with various embodiments of the technology.

FIG. 2 is a partially schematic block diagram of a memory device 202 (e.g., the memory device 102a of FIG. 1E or a portion thereof) configured in accordance with embodiments of the technology. The memory device 202 may include an interface die 204 and one or more core dies 206. For clarity, only a single core die 206 is shown in FIG. 2. It should be understood, however, that multiple core dies 206 can be coupled to the interface die 204 in other embodiments. Furthermore, in order to highlight operation of a test procedure, only certain components of the interface die 204 involved in the testing process are shown in FIG. 2. It should be understood, however, that the interface die 204 can include other components than shown in FIG. 2 and that these other components can be involved in various operations of the memory device 202. For example, various components are shown coupled via multiplexers to represent that signals may be routed along different signaling paths. For purposes of clarity, the signals which control these multiplexers as well as the logic circuits of the interface die 204 that control such routing are not shown in FIG. 2.

As shown, the memory device 202 includes three different interface terminals for accessing the core die(s) 206 and/or one or more circuits of the memory: native micro-bumps (μBumps) 205, DA μBumps 216, and test interface μBumps 220. In some embodiments, the native μBumps 205 can be included in the μBumps 111 of FIG. 1E. The native μBumps 205 may be coupled to a host device (e.g., the processor 110a of FIG. 1E) via one or more channels (e.g., one or more of the channels 105 of FIG. 1E). The test interface μBumps 220 can be part of a specific interface protocol, such as the IEEE 1500 interface (also referred to as a P1500 interface). In general, the test interface μBumps 220 can be referred to as P1500 μBumps 220 and/or referenced by terms such as P1500 operational mode, P1500 circuits, or the like. It should be understood, however, that other test interface protocols may be used in other embodiments of the present technology.

In some embodiments, the memory device 202 can include three different operational modes that correspond to the difference interface terminals for accessing the core die(s) 206. More specifically, the memory device 202 can include a native operational mode, a DA operational mode, and a P1500 operational mode. The operational modes can contain one or more sub-operational modes, each of which primarily use a respective one of the interface terminals to communicate information to and from the memory device 202. For example, the native operational mode of the memory device 202 can include an HBM standby mode and/or a native mode that each primarily use the native μBumps 205 to communicate with the core die(s) 206. As another example, the DA operational mode can include a DA 1500 mode, a DA direct mode, and/or a DA hybrid mode that each primarily use the DA μBumps 216 to communicate with the core die(s) 206. As a further example, the P1500 operational mode can include a P1500 standby mode and/or a BIST mode that each primarily use the P1500 μBumps 220. It should be understood, however, that the memory device 202 may have more or fewer operational and/or sub-operational modes than discussed above.

Referring to the native operational mode of the memory device 202, the memory device 202 can (a) receive a reset signal (e.g., via the native μBumps 205) to transition the memory device 202 to the HBM standby mode, and/or (b) receive a command (e.g., via the native μBumps 205) to transition the memory device 202 into a native mode. The native mode can represent a normal operational mode of the memory device 202 in which memory operations are performed according to signals sent to and received from a host device or another device external the memory device 202. For example, in the native mode, the interface die 204 can send and receive information via the native μBumps 205. In these embodiments, the host device can use the native μBumps 205 to initiate one or more modes or operations of the memory device 202, such as a refresh mode of the memory device. Additionally, or alternatively, the host device can access information in one or more of the core die(s) 206 by sending and receiving information to the memory device 202 using the native μBumps 205.

In an example access operation, signals from the host device or another device external to the memory device 202 can be received at the native μBumps 205. The signals can instruct the memory device 202 to perform an access operation, such as a read operation or a write operation on one or more memory cells of one or more of the core dies 206. More specifically, the signals can include a data packet AWORD that includes (a) command information instructing the memory device 202 to execute a read operation or a write operation and (b) address information specifying memory cells of the core die(s) 206 to be read from or written to as part of the read operation or write operation, respectively. For example, each of the core dies 206 can include a memory array that each includes memory cells arranged in memory regions (e.g., memory banks) and/or at the intersection of rows (word lines) and columns (bit lines). Address information contained in the data packet AWORD can specify a row address, a column address, a bank address, a core die 206, or the like, to identify a memory location for the read or write operation. In some embodiments, the command information of the data packet AWORD can include clock signals used for timings of operations and/or command identifiers.

Responsive to the address information during a read command, one or more of the core dies 206 can read data from the identified memory cell(s) and provide the data as part of a data packet DWORD to the native μBumps 205. Responsive to the address information during a write operation, a data packet DWORD can be received at the native μBumps 205 in addition to the data packet AWORD. Continuing with this example, the data packet DWORD can contain information to be written to memory cells of one or more of the core die(s) 206 that are specified in address information contained in the data packet AWORD. In turn, the data packets AWORD and DWORD can be provided to the core die(s) 206, and the core die(s) 206 can proceed to write the information contained in the data packet DWORD to the memory cells specified by the address information in the data packet AWORD.

In some embodiments, the interface die 204 can include a serializer circuit 233. The serializer circuit 233 can be electrically positioned along a path extending between the core dies 206 and the native μBumps 205. The serializer circuit 233 can be configured to help transfer information between the core dies 206 and the native μBumps 205. For example, the memory device 202 can include a smaller number of native μBumps 205 than a number of connections extending between the interface die 204 and core die(s) 206. Continuing with this example, the serializer circuit 233 can receive information (e.g., from one or more of the core dies 206) in parallel along a first number of data lines. In turn, the serializer circuit 233 can transmit the information (e.g., to the native μBumps 205) in a serial fashion along a second number of data lines that is smaller than the first number of data lines.

Apart from the native operational mode of the memory device 202, it may be desirable to place the memory device 202 into a test mode, for example, to determine one or more characteristics of the memory device 202. Thus, the memory device 202 of FIG. 2 can include one or more test modes, some of which may utilize the P1500 μBumps 220 and some of which may utilize the DA μBumps 216. Referring to the P1500 μBumps 220, the P1500 μBumps 220 can be used to send signals to or receive signals from the host device or another device external to the memory device 202. More specifically, the P1500 μBumps 220 can be used by the memory device 202 when operating in the P1500 operational mode. For example, the memory device 202 can receive a test mode reset signal (e.g., via the P1500 μBumps 220) to transition the memory device 202 to the P1500 standby mode. The P1500 standby mode can be similar to the HBM standby mode of the native operational mode discussed above except that the memory device 202 waits to receive one or more commands via the P1500 μBumps 220 (as opposed to via the native μBumps 205 and/or via the DA μBumps 216).

Additionally, or alternatively, the memory device 202 can receive one or more commands (e.g., via the P1500 μBumps 220) to transition the memory device 202 into the BIST mode to, for example, test the memory device 202 using a testing interface (e.g., a P1500 interface). As shown in FIG. 2, the testing interface includes the P1500 μBumps 220, a test interface circuit 224, a BIST sequencer circuit 228, a look-up table circuit 230, an input buffer circuit 234, an output buffer circuit 235, and an error catch memory (ECM) circuit 232. For the sake of clarity, the BIST mode and the testing interface of the memory device 202 are discussed below in relation to performing a test that involves writing a pattern of data into one or more memory cells of the core die(s) 206, reading the pattern of data from the one or more memory cells, and comparing the written pattern of data to the read pattern of data. It should be appreciated, however, that this is merely one example of a test that can be performed on the memory device 202 using the testing interface. Therefore, the testing interface can include other circuit components and/or electrical connections than shown in FIG. 2, for example, to perform one or more other tests on the memory device 202.

The P1500 μBumps 220 of the testing interface are electrically coupled to the BIST sequencer circuit 228 via the test interface circuit 224 (e.g., hereinafter referred to as "the P1500 circuit 224"). The P1500 circuit 224 can interpret signals sent to and received from the P1500 μBumps 220 using P1500 signaling protocols. For example, the P1500 circuit 224 can translate signals received at the P1500 μBumps 220 into signals usable by other circuits of the memory device 202. As another example, the P1500 circuit 224 can translate various signals received from the other circuits of the memory device 202 into signals usable by the host device or another device external to the memory device 202. As discussed in greater detail below with respect to FIG. 3, the P1500 circuit 224 can include various registers that facilitate transitioning the memory device 202 into a desired test mode and/or executing various test operations.

During the BIST mode, the memory device 202 can send and receive signals using the P1500 μBumps 220 to operate the BIST sequencer circuit 228. For example, a host device or another device external the memory device 202 can transmit instructions to the P1500 μBumps 220 of the memory device 202 commanding the memory device 202 to perform a test on one or more of the core dies 206. In turn, the P1500 circuit 224 can translate and forward the instructions to the BIST sequencer circuit 228, and the BIST sequencer circuit 228 can generate a test sequence (e.g., a string of logical bits) to, for example, write to memory cells of the core die(s) 206.

The BIST sequencer circuit 228 can include a number of registers that can be used to store addresses of memory cells to test and/or other testing information, such as a test sequence. Because storage space in the BIST sequencer circuit 228 can be limited, all or a subset of the test sequence and/or the memory cell addresses can be generated by the BIST sequencer circuit 228 based at least in part on the instructions received from the P1500 circuit 224. For example, the BIST sequencer circuit 228 can perform a test on a memory cell address identified in the instructions received from the P1500 circuit 224, subsequently increment that memory cell address value by one, and then perform the test on a memory cell corresponding to the newly generated memory cell address value. In embodiments in which the memory device 202 includes the look-up-table circuit 230, such as a data topology (DTOPO) circuit, the BIST sequencer circuit 228 can load test sequences into the look-up table circuit 230 to save space in the BIST sequencer circuit 228. Each entry in the look-up table circuit 230 can be associated with a pointer value (e.g., an index value), and the BIST sequencer circuit 228 can generate a sequence of pointer values in a manner similar to how the BIST sequence 228 generates memory cell address values.

When a test on one or more of the core dies 206 includes writing test sequence data to memory cells of the core die(s) 206 while the memory device 202 operates in the BIST mode, the BIST sequencer circuit 228 can provide address information (e.g., a row, a column address, a bank address, an identifier of a core die 206, etc.) of the memory cells and a test sequence (e.g., data or values to be written to the memory cells) to the input buffer circuit 234. Alternatively, the BIST sequencer circuit 228 can (a) provide the address information to the input buffer circuit 234, and (b) provide index information to the look-up table circuit 230. In turn, the look-up table circuit 230 can provide the test sequence to the input buffer circuit 234 based at least in part on the index information received from the BIST sequencer circuit 228.

The input buffer circuit 234 can include a register configured to store test sequence values and address information received from the BIST sequencer circuit 228. In some embodiments, the input buffer circuit 234 can operate as a first-in first-out (FIFO) circuit. As such, the input buffer circuit 234 can be referred to herein as a write FIFO (WFIFO) circuit 234. After receiving the test sequence and the address information, the input buffer circuit 234 can output test sequence values and the address information, and the memory device 202 can write the test sequence to memory cells corresponding to the address information.

When a test on one or more of the core dies 206 includes reading test sequence data from memory cells of the core die(s) 206 while the memory device 202 operates in the BIST mode, the BIST sequencer circuit 228 can provide address information (e.g., a row, a column address, a bank address, an identifier of a core die 206, etc.) of memory cells from which to read a test sequence that was previously stored on the core die(s) 206. Test sequence values can then be read out from the memory cells corresponding to the address information to the output buffer circuit 235. The output buffer circuit 235 can be generally similar to the input buffer circuit 234, except that the output buffer circuit 235 is configured to (a) receive information from (as opposed to being configured to output information to) the core die(s) 206 and (b) provide the information to other circuits (e.g., the ECM circuit 232, the P1500 circuit 224, etc.) of the interface die 204. In some embodiments, the output buffer circuit 235 can operate as a FIFO circuit. As such, the output buffer circuit 235 can be referred to herein as a read FIFO (RFIFO) circuit 235.

The ECM circuit 232 can be used to generate result information based on test sequences output from the output buffer circuit 235. More specifically, the ECM circuit 232 can be configured to receive address information and/or test sequences provided to or output from the input buffer circuit 234 during a write operation of a test. The ECM circuit 232 can be further configured to store the address information and the test sequences in one or more registers of the ECM circuit 232. When a read operation is subsequently performed, the ECM circuit 232 can compare (a) the read test sequence output from the output buffer circuit 235 to (b) the test sequence that was written to memory cells during the earlier write operation. The ECM circuit 232 can further generate result information based on the comparison. Result information can include an identification of memory cells that failed to stored test sequence data, an identification of the test operation corresponding to the test sequence, and/or other information useful for diagnosing and/or debugging the memory device 202. The ECM circuit 232 can then provide all or a subset of the result information to the P1500 circuit 224, which can then output the result information to the host device or another device external to the memory device 202 via the P1500 µBumps 220.

In some scenarios, it may be desirable to bypass various components (e.g., the processor 110a of FIG. 1E) of a SiP package to directly send signals to and receive signals from the memory device 202. In these scenarios, the DA µBumps 216 of the memory device 202 can be used. More specifically, all or a subset of the DA µBumps 216 can be organized into a probe pad, and a device (e.g., a test circuit, a probe, etc.) can be coupled to the probe pad. In turn, the external device can use the DA µBumps 216 of the probe pad while the memory device 202 operates in the DA operational mode to send signals directly to or receive signals directly from the memory device 202 (e.g., without these signals being transmitted to and/or passing through other components of the SiP package).

In some embodiments, the memory device 202 can be transitioned (e.g., from the HBM standby mode, from the BIST mode, and/or from another operational or sub-operational mode of the memory device 202) to one of the sub-operational modes of the DA operational mode by activating a DA enable signal. For example, one of the DA µBumps 216 can be used as a DA enable pin. Continuing with this example, when a DA enable signal is asserted and received at the DA enable pin, the memory device 202 can transition to a sub-operational mode (e.g., the DA 1500 mode) of the DA operational mode. Additionally, or alternatively, the memory device 202 can be transitioned to the DA operational mode when the memory device 202 receives a different signal, such as a signal received at one or more of the P1500 µBumps 220 and instructing the memory device to transition to the DA operational mode.

When the memory device 202 is transitioned to the DA 1500 mode of the DA operational mode, the DA µBumps 216 can be used to send and receive signals using the P1500 interface protocol. For example, signals sent to or received from the memory device 202 in the DA 1500 mode can conform to the interface standards of the P1500 µBumps 220 discussed above, except that the signals can be sent and received via the DA µBumps 216 rather than the P1500 µBumps 220. Thus, in the DA 1500 mode, the memory device 202 can use various test circuits of the P1500 interface, such as the P1500 circuit 224, the look-up table circuit 230, and/or the ECM circuit 232 discussed above. More specifically, a device external to the memory device 202 can send information to and/or receive information from the P1500 circuit 224 of the P1500 interface via the DA µBumps 216. Consistent with the discussion of the P1500 circuit 224 above, the P1500 circuit 224 can be used to (a) translate the signals received at the DA µBumps 216 into signals usable by other circuits of the memory device 202 and/or (b) translate various signals received from the other circuits of the memory device 202 into signals usable by the device (e.g., the test circuit, the probe, etc.) external to the memory device 202.

While the memory device 202 is in the DA 1500 mode, test sequences can be loaded into the look-up table circuit 230 through the DA µBumps 216. In some embodiments, each test sequence may represent a string of logical bits which may be provided (serially or in parallel) to one or more of the core die(s) 206. For example, the test sequence can include a number of bits that matches the number of bits of data typically included in a data packets DWORD. As a specific example, while the memory device 202 operates in the DA 1500 mode, a device external to the memory device 202 can provide a string of bits to the DA µBumps 216, the string of bits can be routed to the P1500 circuit 224, and the P1500 circuit 224 can translate the string of bits and/or input the string of bits into the look-up table circuit 230 directly, via the BIST sequencer circuit 228, and/or via a DA converter circuit 226 (described in greater detail below).

In some embodiments, the memory device 202 can be transitioned (e.g., from the DA 1500 mode and/or another mode) to one or more other sub-operational modes of the DA operational mode. For example, the memory device 202 can be transitioned to the DA direct mode. In the DA direct mode, the memory device 202 may be operated in a manner generally similar to the manner the memory device 202 is operated in the native mode described above, except that information is provided to or transmitted from the memory device 202 via the DA µBumps 216 (as opposed to the native µBumps 205). For example, in the DA direct mode, the DA µBumps 216 can receive and/or transmit data packets AWORD and/or DWORD in a manner similar to how the memory device 202 operates when in the native mode.

In some embodiments, the memory device 202 can include less DA µBumps 216 than native µBumps 205. In these embodiments, the memory device 202 can use a deserializer circuit 222 to mimic a write operation of the memory device 202 in the native mode. For example, the deserializer circuit 222 can (a) serially receive a data packet AWORD and/or a data packet DWORD from the DA µBumps 216 and (b) split the data into a number of parallel channels that are used to send the data to the core die(s) 206. The number of parallel channels can be the same or similar to the number of parallel channels used when the memory device 202 operates in the native mode. In turn, information included in the data packet DWORD can be written to memory cells of the core die(s) that correspond to address information included in the data packet AWORD.

In these and other embodiments, the memory device 202 can be transitioned (e.g., from the DA 1500 mode or another mode) to the DA hybrid mode. In some embodiments, the DA hybrid mode can be used to perform a test on one or more memory cells of the core die(s) 206 using data packets similar to the data packets AWORD and DWORD used while the memory device 202 is in the native mode and/or the DA direct mode. More specifically, while the memory device 202 is in the DA hybrid mode, the memory device 202 can receive commands via the DA µBumps 216 instructing the memory device 202 to execute a test operation. The commands can include data packets, such as data packets AWORD and/or DWORD, similar to signals received at the DA µBumps 216 while the memory device 202 is in the DA direct mode. A data packet DWORD received at the DA µBumps 216 while the memory device 202 is in the DA hybrid mode, however, can include pointer information (e.g., in addition to or in lieu of test sequence data). The pointer information can be transmitted to the look-up table circuit 230 (e.g., via a DA converter circuit 226 and/or the BIST sequencer circuit 228), and the look-up table circuit 230 can be used to retrieve a pre-loaded test pattern corresponding to the pointer information. In turn, the memory device 202 can execute a testing procedure in accordance with the pre-loaded test pattern retrieved from the look-up table circuit 230. In some embodiments, the memory device 202 can additionally, or alternatively, use various other circuits of the interface die 204 while operating in the DA hybrid mode. For example, a testing procedure of the memory device 202 while the memory device 202 is in the DA hybrid mode can utilize the P1500 circuit 224 and/or the ECM circuit 232.

Figure 3:
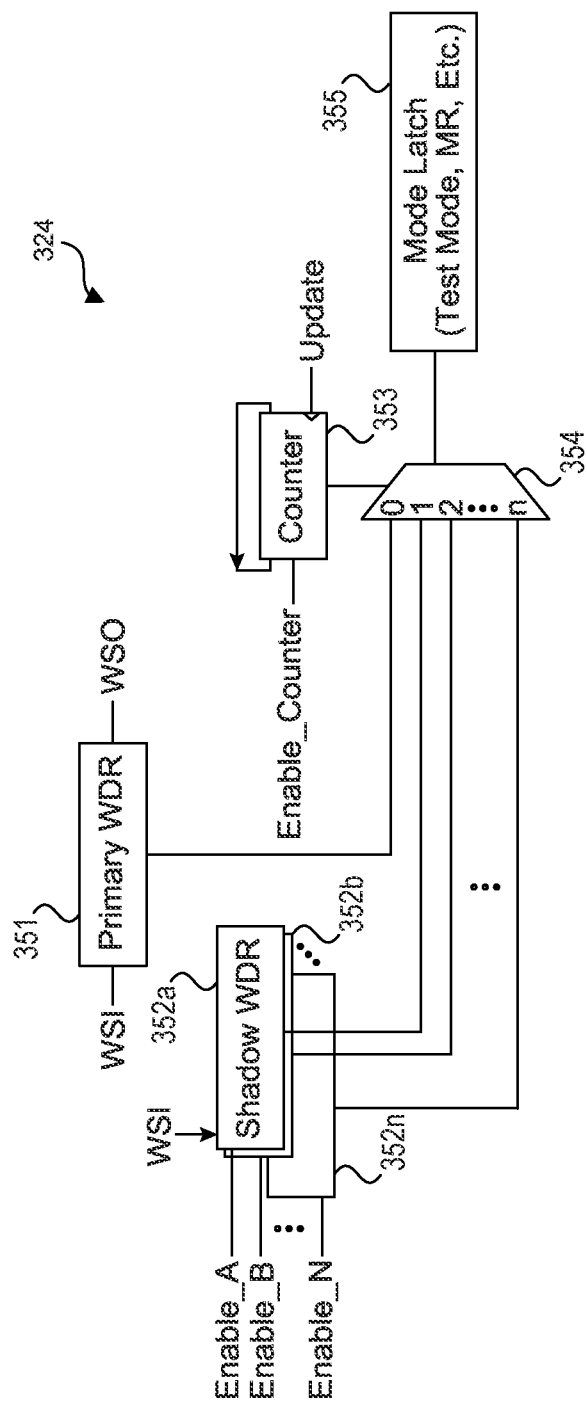
FIG. 3 is a partially schematic block diagram of a portion of serial testing interface configured in accordance with various embodiments of the present technology.

FIG. 3 is a partially schematic block diagram of a portion of a P1500 circuit 324 (e.g., the P1500 circuit 224 of FIG. 2) configured in accordance with various embodiments of the present technology. As shown, the portion of the P1500 circuit 324 includes a primary WDR 351, at least one shadow WDR 352 (identified individually as WDR 352a through WDR 352n in FIG. 3), a counter 353, and a multiplexer 354. The primary WDR 351 can be a shift register used to store information (e.g., test mode address bits and/or test mode data) corresponding to various instructions received at a WIR (not shown) of the P1500 circuit 324. For example, the primary WDR 351 can receive a WSI signal as an input. The WSI signal can include information to be loaded into the primary WDR 351. The primary WDR 351 can further be configured (a) to output the loaded information to an input of the multiplexer 354 and/or (b) to output a WSO signal to other components (not shown) of the P1500 circuit 224, such as an output pin of the P1500 circuit 224. In some embodiments, the primary WDR 351 is a 15-bit register formed of 15 corresponding flipflops. In other embodiments, the primary WDR 351 can have a different size and/or can be formed of other circuit components in addition to or in lieu of flipflops.

Referring now to the shadow WDR(s) 352, one or more of the shadow WDRs 352 can be duplicates of the primary WDR 351. For example, a shadow WDR 352 can be a shift register having a same size (e.g., 15 flipflops) and/or circuit architecture (e.g., comprised of flipflops) as the primary WDR 351. In these and other embodiments, one or more of the shadow WDRs 352 can have a different size (e.g., a different number of flipflops) or different circuit architecture from the primary WDR 351. Similar to the primary WDR 351, the shadow WDR(s) 352 can receive a WSI signal that includes information (e.g., test mode address bits and/or test mode data) to be loaded into the shadow WDR(s) 352. In turn, the shadow WDR(s) 352 can be configured to output the loaded information to an input of the multiplexer 354.

The P1500 circuit 324 can include multiple shadow WDRs 352 in some embodiments, as shown in FIG. 3. For example, the P1500 circuit 324 can include two or three (or more) shadow WDRs 352. In other embodiments, the P1500 circuit 324 can include a single shadow WDR 352.

In some embodiments, instructions received at the WIR of the P1500 circuit 324 is used to determine whether information included in the WSI signal is loaded into the primary WDR 351 or into the shadow WDRs 352. In these and other embodiments, each of the shadow WDRs 352 can receive an enable signal (identified as Enable_A through Enable_N in FIG. 3). The enable signals can be used to control whether information included in the WSI signal is loaded into a respective shadow WDR 352. In some embodiments, the enable signals are vendor specific signals. In embodiments in which the P1500 circuit 324 includes multiple shadow WDRs 352, different enable signals (e.g., different vendor specific commands) can be used to select into which of the shadow WDRs 352 information included in the WSI signal is loaded. In other embodiments, a same enable signal can be provided to multiple shadow WDRs 352. In these and other embodiments, enable signals can be used to select multiple shadow WDRs 352 at the same time such that information included in the WSI signal is loaded into each of the selected shadow WDRs 352 (e.g., at the same time).

As shown in FIG. 3, information loaded into the primary WDR 351 and each of the shadow WDRs 352 is output to the multiplexer 354 on a parallel data bus. The multiplexer 354 is controlled by the counter 353. More specifically, an output of the multiplexer 354 is controlled by the counter 353. The counter 353 receives (a) an Update signal as a clock signal and (b) an Enable_Counter signal. The Update signal can be an IEEE 1500 wrapper serial port update (UPDATEWR) signal and an IEEE 1500 wrapper serial port clock (WRCK) signal. As discussed in greater detail below, the WRCK signal can have a period of approximately 20 ns-60 ns (e.g., between 20 ns and 30 ns). The Enable_Counter signal provided to the counter 353 can be a vendor specific command in some embodiments.

When the counter 353 is not enabled using the Enable_Counter signal, a value stored and output to the multiplexer 354 by the counter 353 is zero or some other initial value. As such, the multiplexer 354 outputs information it receives from the primary WDR 351 to one or more mode latches 355 (e.g., test mode latches, mode registers, etc.). In other words, when the counter 353 is not enabled, the P1500 circuit 324 operates as if it does not include the shadow WDRs 352, and information loaded into the primary WDR 351 is output to the mode latches 355 by default.

On the other hand, when the counter 353 is enabled using the Enable_Counter signal, a value stored and output by the counter 353 to the multiplexer 354 can be incremented by serial chain update commands of the UPDATEWR signal that are executed at various transitions (e.g., every transition) of the WRCK signal. As the value of the counter 353 is incremented, the output of the multiplexer 354 changes. For example, the multiplexer 354 can initially output the information it receives from the primary WDR 351 to the mode latches 355. Then, as the value of the counter 353 is incremented using the Update Signal, the multiplexer 354 can output the information it receives from one of the shadow WDRs 352 to the mode latches 355 (instead of the information it receives from the primary WDR 351).

In some embodiments, this process can continue. For example, the value of the counter 353 can be incremented at a next execution of the UPDATEWR and transition of the WRCK signal. In embodiments in which the P1500 circuit 324 includes multiple shadow WDRs 352, the multiplexer 354 can output information it receives from a next shadow WDR 352. On the other hand, in embodiments in which the P1500 circuit 324 includes a single shadow WDR 352, the value of the counter 353 can be reset and/or wrap around to zero or the initial state of the counter value, and the multiplexer 354 can again output the information it receives from the primary WDR 351.

In this manner, the counter 353 and the multiplexer 354 can be used to cycle through the information loaded into the primary WDR 351 and/or into one or more of the shadow WDR 352 such that different information can be output to the mode latches 355 each time the UPDATEWR signal is executed at transitions of the WRCK signal. In embodiments in which the transitions of the WRCK signal occur approximately every 20 ns-30 ns, the multiplexer 354 can output different information to the mode latches 355 every 20 ns-30 ns. This is well within a test mode loading spec tMRD for most (if not all) testing, diagnosing, and/or debugging activities of the HBM device.

In some embodiments, a vendor specific command can be used to set a limit of the value stored and output by the counter 353. For example, in embodiments in which the P1500 circuit 324 includes three shadow WDRs 352 but a test mode sequence requires only three different sets of information be provided to the mode latches 355, a vendor specific command can be input into the P1500 circuit 324 (e.g., into the counter 353 and/or into the WIR of the P1500 circuit 324) to limit the value of the counter 353 ranging from 0-2). Continuing with this example, when the value of the counter 353 is zero, the multiplexer 354 can output the information loaded into the primary WDR 351. The counter value can then be incremented (to one) at a next transition of the WRCK signal, and the multiplexer 354 can output the information loaded into a first shadow WDR 352. The counter value can again be incremented (to two) at a next transition of the WRCK signal, and the multiplexer 354 can output the information loaded into a second shadow WDR 352. Because the counter value has been limited to two by the vendor specific command, the counter value can be reset or wrap back around to its initial state (e.g., to zero) at a next transition of the WRCK signal instead of being incremented to three. As a result, the multiplexer 354 outputs the information loaded into the primary WDR 351 instead of the information loaded into the third shadow WDR 352.

Figure 4:
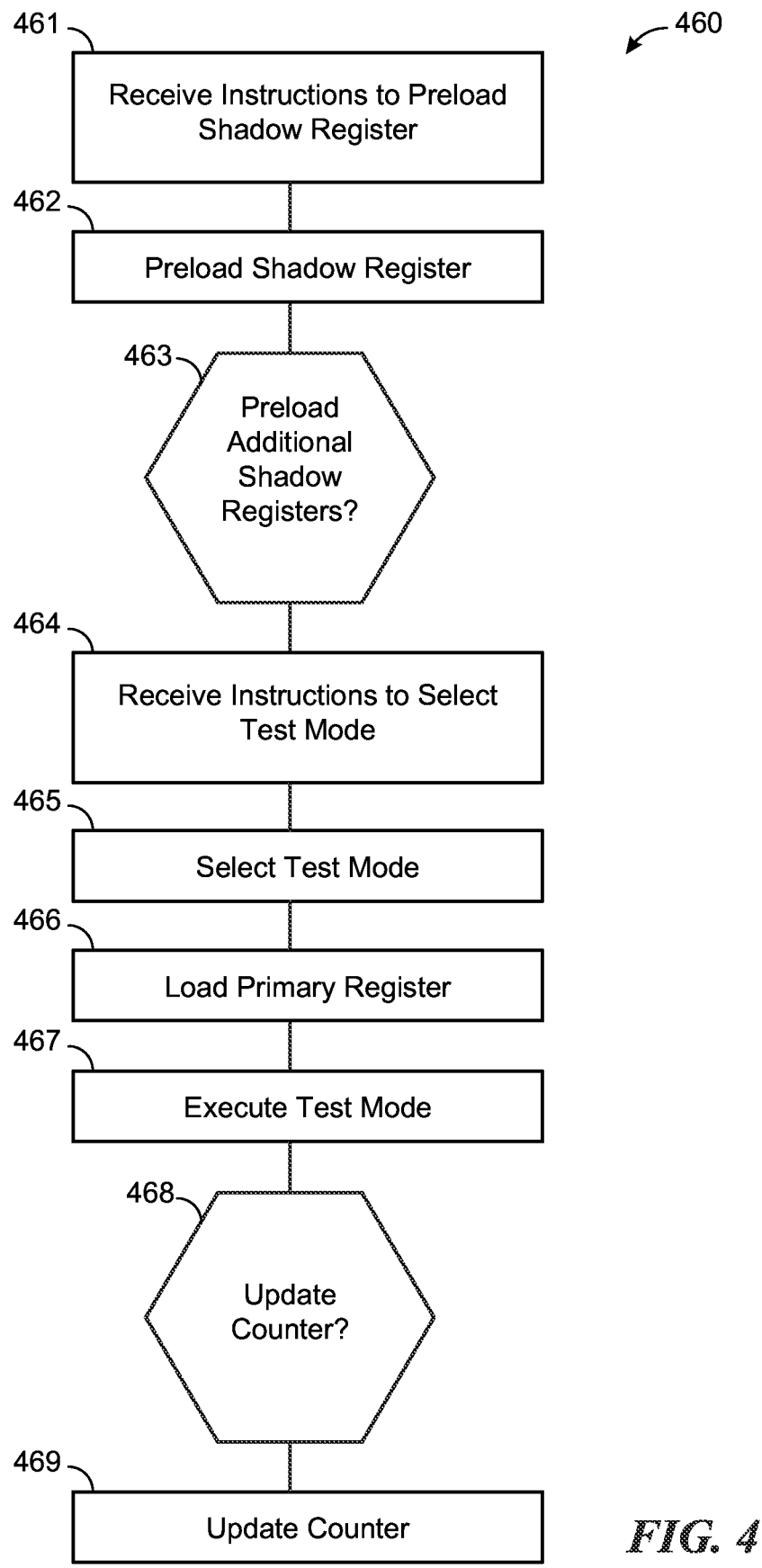
FIG. 4 is a flow diagram method of operating the portion of the serial testing interface of FIG. 3 in accordance with various embodiments of the present technology.

FIG. 4 is a flow diagram illustrating a method 460 of operating the P1500 circuit 324 of FIG. 3 in accordance with various embodiments of the present technology. In some embodiments, all or a subset of one or more of the steps of the method 460 can be executed by various components of an apparatus (e.g., a memory system, an HBM device, etc.), such as any one of the apparatuses 100 of FIGS. 1A-1E. For example, all or a subset of one or more steps of the method 460 can be executed by a host device, a processor, a package substrate, a memory device, an interposer, an interface die, a core die, and/or one or more various circuits (e.g., a P1500 circuit of a P1500 testing interface) disposed thereon. In these and other embodiments, all or a subset of one or more of the steps of the method 460 can be executed by a device (e.g., a testing circuit, a probe, an upstream controller or processor, etc.) external the apparatus and/or by manufacturer or a user of the apparatus. Furthermore, any one or more of the steps of the method 460 can be executed in accordance with the discussion above.

At block 461, the method 460 begins by receiving instructions to preload first information into a shadow register. The shadow register can be a shadow WDR 352 of FIG. 3. In some embodiments, the instructions can be a vendor specific command. In these and other embodiments, the instructions can be received at a testing interface, such as at a P1500 circuit of a P1500 testing interface. For example, the instructions can be received at a WIR of the P1500 circuit. In these and still other embodiments, the first information can be first test mode address bits and/or test mode data, and/or the first information can be included in a WSI signal provided to the shadow register. The first information can correspond to a test mode or another operational mode of an HBM device or of a memory device. In other embodiments, the first information can include one or more commands and/or data sets.

At block 462, the method 460 continues by preloading the shadow register with the first information. Preloading the shadow register can include enabling the shadow register. Enabling the shadow register can include receiving a vendor specific command and/or selecting the shadow register using a vendor specific command. The vendor specific command at block 462 can be the same command as or a different command from the vendor specific command received at block 461. In some embodiments, enabling the shadow register can include enabling only the shadow register or enabling multiple ones of the shadow registers (e.g., at the same time).

Preloading the shadow register with the first information can include (a) providing the shadow register with a WSI signal that includes the first information and (b) loading the first information into the shadow register (e.g., one bit at a time and/or in accordance with a minimum clock rate specification, known as tCKTP). Continuing with the parenthetical example, assuming the minimum clock rate specification is 20 ns, loading 15 bits of the first information into the shadow register would take approximately 300 ns. In some embodiments, loading the first information into the shadow register can include storing the first information in the shadow register at least until the first information is recalled or output from the shadow register and/or until the first information is cleared from the shadow register (e.g., with new information).

At block 463, the method 460 determines whether to preload additional shadow registers with information. For example, the method 460 can determine to preload additional shadow registers when (a) there are additional shadow registers that have yet to be preloaded with information and/or (b) the method 460 receives additional instructions (similar to the instructions received at block 461) for loading another shadow register with information. When the method 460 determines to preload another shadow register at block 463, the method 460 can return to block 461.

On the other hand, the method 460 can determine not to preload additional shadow registers when (a) there are no other shadow registers that have yet to be preloaded with information, (b) the method 460 does not receive additional instructions (similar to the instructions received at block 461) for loading another shadow register with information, and/or (c) the method 460 receives instructions for selecting a test mode or other operational mode. When the method 460 determines not to preload additional shadow registers at block 463, the method 460 can proceed to block 464.

At block 464, the method 460 continues by receiving instructions for selecting a test mode or other operational mode. The instructions can include a command to execute one or more tests or other operations. In these and other embodiments, the instructions can include a command to transition the HBM device or the memory device into a specific test mode or other operational mode. In these and still other embodiments, the instructions can include instructions for loading a primary register with second information corresponding to a test mode or to another operational mode. In some embodiments, the instructions received at block 464 can be a vendor specific command.

At block 465, the method 460 selects a test mode or another operational mode that corresponds to the instructions received at block 464. Selecting the test mode or another operational mode can include retrieving or generating the second information (e.g., address bits and/or data) corresponding to the selected test mode or operational mode. In these and other embodiments, selecting the test mode or the other operational mode can include providing a WSI signal that includes the second information to the primary register. In these and still other embodiments, the second information can be different from, the same as, or similar to the first information and/or other information loaded into one or more of the shadow registers at block 462.

At block 466, the method 460 continues by loading the primary register. The primary register can be the primary WDR 351 of FIG. 3. Loading the primary register can include loading the primary register with the second information corresponding to the test mode or other operational mode selected at block 465. In some embodiments, loading the primary register can include selecting the primary register (e.g., via instructions received at a WIR of a P1500 circuit). Similar to the shadow registers, the second information can be loaded into the primary register one bit at a time, in accordance with the minimum clock rate specification tCKTP, and/or based at least in part on an IEEE 1500 wrapper serial port shift (SHIFTWR) signal. Continuing with this example, assuming the minimum clock rate specification is 20 ns, loading 15 bits of the second information into the primary register would take approximately 300 ns. In these and other embodiments, loading the second information into the primary register can include storing the second information in the primary register at least until the second information is recalled or output from the primary register and/or until the second information is cleared from the primary register (e.g., with new information).

At block 467, the method 460 continues by executing the selected test mode or other operational mode. For example, the method 460 can execute the selected test mode or other operational mode by outputting, from a multiplexer (e.g., the multiplexer 354 of FIG. 3), information that is loaded into the primary register or into one of the shadow registers. As discussed above, the output of the multiplexer can be controlled by a counter such that information output from the multiplexer depends at least in part on a value output by the counter. When the value of the counter is zero (or another initial value), the second information loaded into the primary register can be output by the multiplexer to one or more mode latches (e.g., the mode latches 355 of FIG. 3). Other values output by the counter can cause the multiplexer to output information (e.g., the first information) loaded into one of the shadow registers. In these and other embodiments, the method 460 can execute the selected test mode or other operational mode by transitioning the HBM device and/or the memory device to the test mode or other operational mode. In these and still other embodiments, the method 460 can execute the selected test mode or other operational mode by executing one or more test operations or other operations corresponding to the selected test mode or other operational mode.

At block 468, the method 460 continues by determining whether to update the value of the counter. For example, as discussed in greater detail above with respect to FIG. 3, the value of the counter can be updated to change the information output from the multiplexer to the mode latches. In some embodiments, the method 460 can determine not to update the value of the counter when the counter is not enabled using a vendor specific signal or another signal, such as an Enable_Counter signal. In these and other embodiments, the method 460 can determine not to update the value of the counter when a test mode sequence does not require the mode latches to be updated with new information. When the method 460 determines not to update the value of the counter, the method 460 can return to block 461 and/or to block 464. In some embodiments, the value of the counter can be reset when the method 460 returns to block 461 and/or to block 464.

On the other hand, the method 460 can determine to update the value of the counter when the counter is enabled using a vendor specific signal or another signal, such as the Enable_Counter signal. In these and other embodiments, the method 460 can determine to update the value of the counter when a test mode sequence requires the mode latches to be updated with new information. When the method 460 determines to update the value of the counter, the method 460 can proceed to block 469 to update the value of the counter.

At block 469, the method 460 continues by updating the value of the counter. Updating the value of the counter can include incrementing the value or resetting the value of the counter to zero or another initial state (e.g., by wrapping the value of the counter back to zero or the initial state). In these and other embodiments, updating the value of the counter can include updating the value of the counter in accordance with an Update signal, such as an UPDATEWR signal. The UPDATEWR signal can be executed at transitions of a WRCK signal (e.g., such that the UPDATEWR signal is execute every 20 ns-30 ns, thereby updating the value of the counter every 20 ns-30 ns at least while the counter is enabled). After updating the value of the counter, the method 460 can return to block 467 (e.g., to output, from the multiplexer, the first information loaded into the shadow register to the mode latches).

Although the steps of the method 460 are discussed and illustrated in a particular order, the method 460 of FIG. 4 is not so limited. In other embodiments, the steps of the method 460 can be performed in a different order. In these and other embodiments, any of the steps of the method 460 can be performed before, during, and/or after any of the other steps of the method 460. For example, steps 464-466 can be performed before or during any one or more of the steps 461-463. Furthermore, a person skilled in the art will readily recognize that the method 460 can be altered and still remain within these and other embodiments of the present technology. For example, one or more steps of the method 460 can be omitted and/or repeated in some embodiments. As a specific example, when the shadow register(s) are not loaded with information and/or when the counter is not enabled, steps 461-463, 468, and 469 can be omitted such that only section 470 of the method 460 is performed.

For the sake of clarity and understanding, consider the following example in which (a) a P1500 circuit includes a primary register and a single shadow register, and (b) a test mode sequence requires mode latches to be (i) loaded with first information, (ii) cleared of the first information, (iii) loaded with the first information, and (iii) cleared of the first information. In HBM devices lacking a shadow register, each change of the information in the mode latches would require approximately 300 ns (assuming the data is 15 bits in length and one bit can be loaded into the primary register every 20 ns). Thus, approximately 1200 ns is required to execute the test mode sequence in HBM devices lacking a shadow register.

In contrast, in HBM devices of the present technology, the information used clear the first information from the mode latches can be preloaded into the shadow register (requiring 300 ns), and the first information can be loaded into the primary register (requiring 300 ns). The primary register can provide the first information to a multiplexer, and the shadow register can provide the information used to clear the first information to the multiplexer. As discussed above, an output of the multiplexer can be controlled by a value output from a counter. Because the value output from the counter is zero or some other initial value, the multiplexer can output the first information to the mode latches upon execution of a first instance of an UPDATEWR signal. After approximately 20 ns, the value of the counter can be incremented upon the execution of a second instance of the UPDATEWR signal. In turn, the next input of the multiplexer is output from the multiplexer. Here, the next input of the multiplexer is the information pre-loaded into the shadow register and used to clear the first information from the mode latches. After another 20 ns, the value of the counter is incremented (or wrapped back around to its initial state) upon execution of a third instance of the UPDATEWR signal, thereby causing the multiplexer to output the first information to the mode latches that is received from the primary register. After another 20 ns, the value of the counter is again incremented upon execution of a fourth instance of the UPDATEWR signal, thereby causing the multiplexer to output (to the mode latches) the information used to clear the first information from the mode latches and received from the shadow register. Thus, after factoring in the amount of time required to load the primary register and/or the shadow register, the same test mode sequence that took an HBM device lacking a shadow register approximately 1200 ns to complete, requires approximately 660 ns to complete using an HBM device configured in accordance with various embodiments of the present technology. Furthermore, the mode latches in the HBM device lacking a shadow register could only be updated with new information approximately every 300 ns. In contrast, HBM devices of the present technology facilitate updating the mode latches with new information approximately every 20 ns-30 ns once the shadow register is loaded with information.

In the event that an HBM device of the present technology includes multiple shadow registers, the present technology facilitates quickly executing test mode sequences that require more than two different sets of information being loaded into the mode latches. Additionally, or alternatively, one or more shadow registers can store and output information currently stored and output by the primary register and/or another shadow register. For example, consider the following example in which (a) a P1500 circuit includes a primary register and three shadow registers, and (b) a test mode sequence requires mode latches to be (i) loaded with test mode data, (ii) cleared of the test mode data, (iii) loaded with the test mode data, and (iii) cleared of the test mode data. In this example, the primary register and the second shadow register can be loaded with the test mode data, and the first and third shadow registers can be loaded with the data used to clear the test mode data from the mode latches. As the counter is incremented from value zero to value three, the output of the multiplexer sequences through the test mode data (output from the primary register); the data used to clear the test mode data (output from the first shadow register); the test mode data (output from the second shadow register); and the data used to clear the test mode data (output from the third shadow register). Other test mode sequences and/or other patterns of using the primary and shadow registers to store and output information and/or data corresponding to the test mode sequences are of course possible and within the scope of the present technology.

Figure 5:
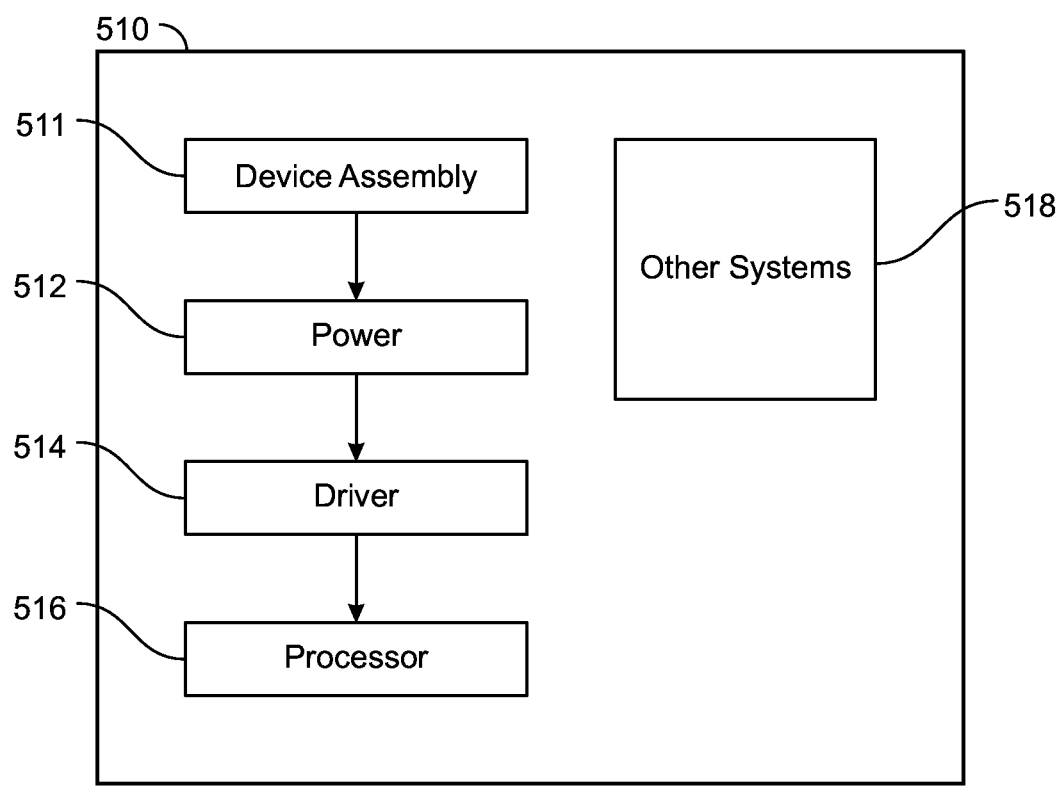
FIG. 5 is a schematic view of a system that includes a memory device in accordance with embodiments of the present technology.

FIG. 5 is a schematic view of a system that includes a memory device in accordance with embodiments of the present technology. Any one of the foregoing memory devices described above with reference to FIGS. 1A-4 can be incorporated into any of a myriad of larger and/or more complex systems, a representative example of which is system 510 shown schematically in FIG. 5. The system 510 can include a semiconductor device assembly 511, a power source 512, a driver 514, a processor 516, and/or other subsystems and components 518. The semiconductor device assembly 511 can include features generally similar to those of the memory device described above with reference to FIGS. 1A-4, and can, therefore, include various features of preloading information and/or data into one or more shadow registers and later recalling the information and/or data in sequence (e.g., with information and/or data loaded into a primary register). The resulting system 510 can perform any of a wide variety of functions, such as memory storage, data processing, and/or other suitable functions. Accordingly, representative systems 510 can include, without limitation, hand-held devices (e.g., mobile phones, tablets, digital readers, and digital audio players), computers, vehicles, appliances, and other products. Components of the system 510 may be housed in a single unit or distributed over multiple, interconnected units (e.g., through a communications network). The components of the system 510 can also include remote devices and any of a wide variety of computer readable media.

C. Conclusion

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any materials incorporated herein by reference conflict with the present disclosure, the present disclosure controls. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and both A and B. Where the context permits, singular or plural terms can also include the plural or singular term, respectively. Additionally, the terms "comprising," "including," "having" and "with" are used throughout to mean including at least the recited feature(s) such that any greater number of the same feature and/or additional types of other features are not precluded. Moreover, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments can perform steps in a different order. As another example, various components of the technology can be further divided into subcomponents, and/or various components and/or functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology.

It should also be noted that other embodiments in addition to those disclosed herein are within the scope of the present technology. For example, embodiments of the present technology can have different configurations, components, and/or procedures in addition to those shown or described herein. Moreover, a person of ordinary skill in the art will understand that these and other embodiments can be without several of the configurations, components, and/or procedures shown or described herein without deviating from the present technology. Accordingly, the disclosure and associated technology can encompass other embodiments not expressly shown or described herein.

We claim:

1. An IEEE 1500 interface, comprising:
   a primary wrapper data register (WDR) configured to store first information received in a first wrapper serial input (WSI) signal;
   a shadow WDR configured to store second information received in a second WSI signal;
   a multiplexer configured to (a) receive the first information from the primary WDR, (b) receive the second information from the shadow WDR, and (c) output the first information or the second information based at least in part on a control signal input into the multiplexer; and
   a counter configured to output the control signal to the multiplexer based at least in part on a value stored by the counter.

2. The IEEE 1500 interface of claim 1, wherein:
   the counter is configured to receive an enable signal having a first state and a second state;
   when the enable signal is in the first state, the counter is disabled from updating the value stored by the counter; and
   when the enable signal is in the second state, the counter is enabled to update the value stored by the counter.

3. The IEEE 1500 interface of claim 2, wherein, when the enable signal is in the first state, the multiplexer is configured to output the first information received from the primary WDR.

4. The IEEE 1500 interface of claim 2, wherein:
   the counter is further configured to receive an update signal;
   the update signal includes an IEEE 1500 wrapper serial port update (UPDATEWR) signal; and
   when the enable signal is in the second state, the counter is configured to update the value stored by the counter each time the UPDATEWR signal is asserted in accordance with a transition of an IEEE 1500 wrapper serial portion clock (WRCK) signal.

5. The IEEE 1500 interface of claim 4, wherein:
   the value stored by the counter has a limit; and
   when the value reaches the limit, a next update of the value by the counter resets or causes the value to wrap around to an initial state that corresponds to a state of the value when the enable signal is in the first state.

6. The IEEE 1500 interface of claim 1, wherein the shadow WDR is a duplicate WDR of the primary WDR such that the shadow WDR has a same register size as the primary WDR.

7. The IEEE 1500 interface of claim 1, wherein:
   the shadow WDR is configured to receive an enable signal;
   when the enable signal is in a first state, the shadow WDR is disabled from loading the second information included in the second WSI signal; and
   when the enable signal is in a second state, the shadow WDR is enabled to load the second information included in the second WSI signal.

8. The IEEE 1500 interface of claim 1, wherein:
   the shadow WDR is a first shadow WDR;
   the IEEE 1500 interface further comprises a second shadow WDR configured to store third information received in a third WSI signal; and
   the multiplexer is further configured to receive (i) the third information from the second shadow WDR and (ii) output the first information, the second information, or the third information based at least in part on the control signal input into the multiplexer.

9. The IEEE 1500 interface of claim 8, wherein:
the first shadow WDR is configured to receive a first enable signal that, when asserted, enables the first shadow WDR to load the second information received in the second WSI signal;
the second shadow WDR is configured to receive a second enable signal that, when asserted, enables the second shadow WDR to load the third information received in the third WSI signal; and
the first enable signal is different from the second enable signal.

10. A method, comprising:
loading a first register of a serial interface with first information, wherein the first register has a first output in communication with a first input of a multiplexer of the serial interface;
loading a second register of the serial interface with second information, wherein the second register is a duplicate of the first register, and wherein the second register has a second output in communication with a second input of the multiplexer;
outputting the first information to a mode latch via an output of the multiplexer when a control signal input into the multiplexer is in a first state; and
outputting the second information to the mode latch via the output of the multiplexer when the control signal is in a second state different from the first state.

11. The method of claim 10, wherein loading the second register includes asserting an enable signal of the second register such that the second register is enabled to load the second information.

12. The method of claim 10, wherein loading the first register includes loading the first register with the first information in response to receiving instructions for selecting an operational mode of a memory device including the serial interface.

13. The method of claim 10, further comprising updating a value of a counter such that the control signal transitions from the first state to the second state.

14. The method of claim 13, wherein updating the value of the counter includes (a) asserting an enable signal such that the counter is enabled to update the value and (b) asserting an IEEE 1500 wrapper serial port update UPDATEWR signal in accordance with a transition of an IEEE 1500 wrapper serial port clock (WRCK) signal.

15. The method of claim 14, further comprising (a) deasserting the enable signal such that the counter is disabled from updating the value and (b) resetting the value in response to deasserting the enable signal.

16. The method of claim 13, further comprising holding the control signal in the first state until (a) the counter is enabled and (b) the value of the counter is updated.

17. The method of claim 10, further comprising:
loading a third register of the serial interface with third information, wherein the third register is another duplicate of the first register, wherein the third information is different from the first information or the second information, and wherein the third register has a third output in communication with a third input of the multiplexer; and
outputting the third information to the mode latch via the output of the multiplexer when the control signal is in a third state different from the first state and the second state.

18. The method of claim 17, wherein:
loading the second register with the second information includes enabling the second register using a first enable signal; and
loading the third register with the third information includes enabling the third register using a second enable signal different from the first enable signal.

19. A high bandwidth memory (HBM) device, comprising a memory device including one or more core dies, a mode latch, and an interface die having a serial interface, wherein the serial interface comprises:
a primary register configured to store first information received in a first input signal;
a shadow register configured to store second information received in a second input signal;
a multiplexer configured to (a) receive the first information from the primary register, (b) receive the second information from the shadow register, and (c) output the first information or the second information to the mode latch based at least in part on a control signal input into the multiplexer; and
a counter configured to output the control signal to the multiplexer based at least in part on a value stored by the counter.

20. The IEEE 1500 interface of claim 1, further comprising a wrapper boundary register (WBR) and a wrapper bypass register (WBY) in addition to the primary WDR and the shadow WDR.

* * * * *